United States Patent Office 2,955,616
Patented Oct. 11, 1960

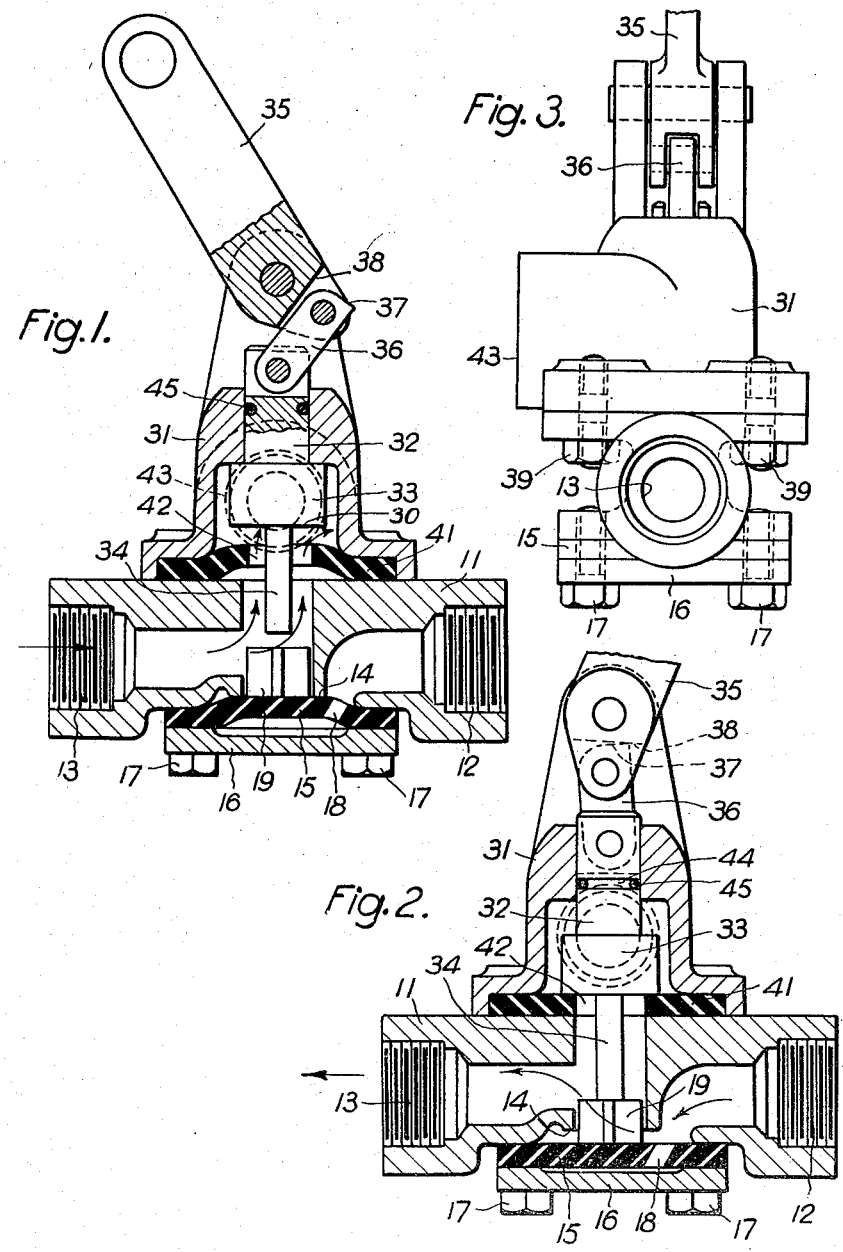
INVENTORS
Charles Roy Jarrett
& Richard Hector Price

2,955,616

FLUID CONTROLLING DIAPHRAGM VALVES

Charles Roy Jarrett and Richard Hector Price, Cwmbran, England, assignors to Saunders Valve Company Limited, Cwmbran, England, a British company Filed Apr. 1, 1955, Ser. No. 498,574

Claims priority, application Great Britain Apr. 29, 1954

6 Claims. (Cl. 137—620)

This invention relates to valves for the control of fluids and an object is to provide a valve which is useful as a pilot valve, i.e. a valve for the control of a fluid supply for actuating some other devices such as a larger valve by means of a piston, a diaphragm or some similar motor.

The valve according to the invention is of the diaphragm type in which the diaphragm co-operates with an annular seating and is held closed by the pressure of the controlled fluid itself which is admitted to the back of the diaphragm through an aperture in the diaphragm. According to the present invention the valve is opened by the aid of mechanism which can be actuated from outside to press the diaphragm positively i.e. mechanically off the seating against the fluid pressure. The member which actually engages the diaphragm to press it off the seating is conveniently a tappet and as there will be a passage within the seating and another one outside the seating, one of the passages communicating with the inlet to and the other with the outlet from the valve body, the tappet could be located in either passage but it is more conveniently located in the inner passage. It can then be guided by the passage but its cross section must not fill the passage in order to leave space for the fluid to flow past it. Preferably, the outflow is through the passage within the seating and the aperture in the diaphragm is in the outside part of the diaphragm. Desirably, the diaphragm is moulded to the shape which corresponds to the closed position.

If the tappet is in the passage within the seating and the outflow is through this passage, the mechanism which leads to the outside of the valve is on the outflow side and there is then no difficulty in providing means for sealing the mechanism at least when the valve is open, while when the valve is closed there is no actual need for sealing.

In the case of a pilot or like valve, when the valve is closed it will be necessary to connect the downstream side of the valve to an exhaust port. To this end a second valve is provided actuated by the mechanism for pressing the diaphragm off its seating, this valve being closed when the diaphragm is pressed off the seating and opened when the diaphragm is pressed against the seating by the fluid pressure having access to the back of the diaphragm, this second valve controlling a passage from the outlet to an exhaust port. The second valve may comprise a shoulder connected with the mechanism for pressing the diaphragm off the seating and an apertured facing in the path of the shoulder and located so that when the diaphragm is pushed off the seating the shoulder closes the aperture in the facing while when the mechanism is moved to allow the diaphragm to return to the seating the shoulder is moved clear of the aperture in the facing, one of these two members in the second valve being resilient so that a good seal is easily obtained. It is desirable that the resilient member should be moulded in such a shape that the two parts move together for a short distance to ensure that the second valve closes before the diaphragm is pressed off the seating and does not open until the diaphragm is back against the seating. Conveniently the facing is made resilient, being in the form of a resilient washer moulded to follow the shoulder. The fluid pressure then helps to press the washer against the shoulder as long as the diaphragm is off the seating.

The mechanism for pressing the diaphragm off the seating may be an axially slidable member aligned with the central part of the diaphragm wihch engages it directly or through a tappet and extends outwardly through a bore in the valve body so that it is accessible from the outside. This form is particularly suitable for a pilot valve as then the shoulder can be formed on the axially slidable member.

To provide for holding the valve open for long periods which is often necessary with a pilot valve, the mechanism may be lockable in the open position. Thus it may include a toggle which can be moved just over the dead-centre position and there be checked by a stop to hold the valve open.

The invention will be further described with reference to the accompanying drawings which illustrate an example.

Figure 1 is a longitudinal section in the closed condition,

Figure 2 is a similar view to Figure 1 but in the open condition, and

Figure 3 is an end view.

The example shown is a valve which can be used as a pilot valve, that is to say, it has an exhaust port which is connected to the downstream side when the valve is closed.

The valve has a body 11 having aligned inlet and outlet connections 12, 13 respectively. The inlet connection 12 is separated from the outlet connection 13 by an annular seating 14 and the body is open opposite the seating. A flexible diaphragm 15 to cooperate with the seating 14 is of substantial thickness of rubber or similar material inert to the fluid to be controlled, reinforced if necessary with fabric, and is clamped against an approximately square facing by the aid of a cover plate 16 held by screws 17, the plate being shaped, recessed or grooved so that even when the valve is open as in Figure 2 there is a little space behind the diaphragm. There is a hole 18 in the outer annulus of the diaphragm so that the fluid from the inlet connection 12 always has access to the back of the diaphragm and except when the diaphragm is forcibly displaced the pressure of the fluid presses the diaphragm against the seating 14, thus holding the valve closed. To reinforce this automatic closing action, the diaphragm is desirably moulded to the shape corresponding to the closed position that is in the shape shown in Figure 1.

The diaphragm can be pushed off the seating by the aid of a tappet 19, the external diameter of which makes it an easy sliding fit within the passage terminating in the seating 14 so that its movements are guided. To enable the fluid to flow past the tappet when the valve is open, the tappet is of cruciform or similar cross section.

The valve body is completed by a bonnet 31 and in this slides a rod 32 having an enlarged part 33 and a stem 34 which co-acts with the tappet 19. The rod 32 is displaceable by the aid of a hand lever 35 pivoted to lugs on the bonnet 31 and connected to the rod by a toggle link 36. As will be seen in Figure 2 when the hand lever 35 has been rocked to open the valve, the toggle linkage is in a slightly over-centre position so that the valve is locked open. A stop is provided to prevent the parts from rocking any further and so allowing the valve to close.

In the illustrated examples this stop is constituted by a shoulder 37 formed on the link 36, this shoulder abutting the bottom of a slot 38 formed in the lower end of the lever 35.

The bonnet is held to the body 11 by studs and nuts 39 and in the base of the bonnet is clamped a thick resilient washer 41 of similar material and construction to the diaphragm 15 and having a central aperture 42 of diameter comparable with the bore in the valve body and substantially greater than that of the stem 34. In the side of the bonnet is an exhaust port 43. In the closed position of the valve, shown in Figure 1, the shoulder 30 at the bottom of the part 33 is well clear of the washer 41 and accordingly the outlet 13 of the valve is connected to the exhaust port 43 and any pressure on the downstream side of the valve will therefore be released. When the valve is closed as in Figure 2 the shoulder on the part 33 presses on the washer 41 thus closing the connection between the outlet 13 and the exhaust port 43. The valve constituted by the part 33 the washer 41 is one which needs little movement from closed position to a position in which flow can take place through it. To avoid making momentary connection between the inlet 12 and the exhaust port 43 it is necessary that the shoulder on the part 33 should bear against the washer 41 before the diaphragm 15 is pushed away from the seating and that the shoulder should remain against the washer 41 until the diaphragm 15 again returns to the seating. To allow for this the washer 41 is moulded to the shape shown in Figure 1 and sufficient lost motion is left between the stem 34 and the tappet 19 to allow the shoulder to reach the washer 41 before the stem 34 through the tappet 19 pushes the diaphragm 15. Although there is no firm backing behind the washer 41 at the instant the shoulder engages it such fluid pressure as exists on the outlet side of the valve reinforces the resilient pressure of the washer 41 and as soon as the diaphragm 15 is pushed off the seating the fluid pressure on the underside of the washer 41 is correspondingly augmented thus ensuring that a good seal is maintained between the washer and the shoulder. As shown in Figure 2 when the valve is fully open the washer 41 has just been pressed down flat against the top of the valve body but this is not essential and there still could be a slight gap between the two around the central part of the washer. When the lever 35 is rocked to close the valve the washer 41 follows the part 33 and the two do not start to separate until the diaphragm 15 is against the seating 14.

In the open position of the valve, leakage out of the bonnet is prevented by the joint formed between the part 33 and the washer 41. When the valve is closed the upper end of the part 33 abuts against the interior of the bonnet. This alone would not prevent leakage and to provide good joint the rod 32 is grooved at 44 to receive a rubber or similar O ring 45.

It will be seen that the valve according to the invention is of very simple construction and free of parts such as springs liable to weakening or breakage, and that it can be made with a minimum of machining operations and without the necessity for close tolerances. It should also be emphasized that the construction shown in the drawings is an example only and that modifications can be made within the scope of the appended claims.

We claim:

1. A fluid control valve comprising a body having an inlet and an outlet co-axially arranged, an annular seating separating a passage within the seating from a passage surrounding the seating, the plane of the seating being parallel to the longitudinal axes of the inlet and outlet, one of said passages communicating with the inlet and the other with the outlet, a flexible diaphragm secured to the body to cooperate with said seating and to bound both said passages, the diaphragm in one position pressing against the seating and thus sealing off one passage from the other and in another position permitting flow over the seating from one passage to the other, a cover over the back of the diaphragm and having means therein to form a space at all times between the cover and the diaphragm, said diaphragm having an aperture therein giving access through the diaphragm at all times of fluid from the inlet to the back of the diaphragm, means within the body and operable from outside the valve body for positively pressing the diaphragm off the seating against the fluid pressure having access to the back of the diaphragm through said aperture, and a second valve actuated by said means for pressing the diaphragm off the seating, said second valve being closed when the diaphragm is pressed off the seating and opened when the diaphragm is pressed against the seating by the fluid pressure having access to the back of the diaphragm, said second valve when open establishing communication between the outlet and an exhaust port.

2. A fluid control valve as set forth in claim 1 wherein said second valve comprises a shoulder connected with the means for pressing the diaphragm off the seating, and an apertured facing in the path of said shoulder, one of said two members, namely the shoulder and facing, being resilient, the facing being located so that when the diaphragm is pressed off the seating the shoulder bears against the facing and closes the aperture therein while when the diaphragm is released and is pressed against the seating the shoulder is clear of the aperture in the facing thereby permitting flow through it.

3. A fluid control valve as set forth in claim 1 wherein said means for pressing the diaphragm off the seating incorporates a toggle which reaches the dead-centre position when the diaphragm has been pressed off the seating and a stop which checks the toggle just beyond the dead-centre position thereby holding the valve open.

4. A fluid control valve according to claim 1, in which a tappet is provided on the diaphragm and adapted to be contacted by the means when actuated to press the diaphragm off the seating.

5. A fluid control valve according to claim 1, in which a second diaphragm is provided mounted on the body and cooperating with the second-mentioned valve to contact therewith when communication between the outlet and the exhaust port is closed.

6. A fluid control valve comprising a body having an inlet and an outlet in alignment, an annular seating in the body separating a passage outside it communicating with the inlet from a passage inside it communicating with the outlet, said annular seating having its axis substantially perpendicular to the axis of the inlet and outlet and said valve body being open opposite the seating, a cover for said opening, a flexible diaphragm over said opening having its margin clamped between the cover and the valve body, the diaphragm being able to flex between a position in which it bears against the seating and a position in which it leaves the seating thereby permitting free communication between said passages, the diaphragm having an aperture through that part of it which is outside the seating and faces the passage communicating with the inlet, a tappet guided in the passage within the seating and of such cross section which is smaller than the passage, means operable from outside the valve body for pressing the tappet against the diaphragm to push the diaphragm off the seating, the cover having means to provide at all times a space between the cover and the back of the diaphragm which communicates with the aperture through the diaphragm, the means for pressing the tappet comprising an axially slidable member aligned therewith, the member being guided in a passage through the valve body whereby it is made externally accessible, the valve body also having an exhaust passage therein surrounding part of said member and communicating at one end with the outlet and at the other end with an exhaust port, a resilient apertured washer sealed to the valve body and set across the exhaust passage with the aperture in the washer surrounding and clearing said member, and a shoulder on said member in such a position that when the member is moved axially to press the tappet against the diaphragm and push the diaphragm off the seating the shoulder presses against the washer thereby closing the exhaust passage while when the diaphragm is against the seating the shoulder is clear of the washer thus opening the exhaust passage.

References Cited in the file of this patent

UNITED STATES PATENTS

| | | |
|---|---|---|
| 907,458 | Cavanaugh | Dec. 22, 1908 |
| 2,073,112 | Lindinger | Mar. 9, 1937 |
| 2,101,468 | Dale | Dec. 7, 1937 |
| 2,377,227 | Griswold | May 29, 1945 |
| 2,407,761 | McPherson | Sept. 17, 1946 |
| 2,450,315 | Vetrano | Sept. 28, 1948 |
| 2,544,056 | Stortz | Mar. 6, 1951 |
| 2,648,349 | McGarry | Aug. 11, 1953 |
| 2,701,118 | Uhler | Feb. 1, 1955 |

FOREIGN PATENTS

| | | |
|---|---|---|
| 903,013 | France | Sept. 21, 1945 |
| 663,713 | Great Britain | of 1951 |